July 4, 1967 E. LANG 3,329,165
SOLENOID-OPERATED MULTIWAY VALVES
Filed Feb. 10, 1965 2 Sheets-Sheet 1

INVENTOR
Erich Lang

United States Patent Office

3,329,165
Patented July 4, 1967

3,329,165
SOLENOID-OPERATED MULTIWAY VALVES
Erich Lang, Ludwigsburg, Wurttemberg, Germany, assignor to Erich Herion, Stuttgart-Frauenkopf, Germany
Filed Feb. 10, 1965, Ser. No. 431,633
Claims priority, application Germany, Feb. 12, 1964,
H 51,656
6 Claims. (Cl. 137—625.5)

ABSTRACT OF THE DISCLOSURE

A valve casing is axially divided into a valve chamber and two outer chambers by membranes clamped to the casing and integral with a movable valve element of resilient material which is moved axially in the valve chamber between two valve seats by a rod attached to a solenoid armature in one of the outer chambers. The rod extends through one of two tubular extensions which respectively connect the membranes with the valve element, and is anchored in the latter by its resilient tension. For high pressure operation, the outer chambers are connected through a bore in the rod and are liquid-filled.

---

The invention relates to solenoid-operated multiway valves having a double-acting poppet valve element and a solenoid chamber sealed from the valve chamber proper. The invention relates particularly to valves lined with plastics for controlling the flow of corrosive gasses and liquids. The solenoid chamber and a pressure balancing chamber, if provided in such valves, must be sealed from the valve chamber.

It is the object of the present invention to simplify the construction of the valve element and of the seals between the valve chamber and the outer solenoid and balancing chambers. This is achieved by making the valve element of a yieldably resilient material, and by providing it with axial tubular extensions having flaring or funnel-shaped ends clamped to the walls of the valve casing. The actuating rod of the solenoid extends through one of the extensions into the valve element. It has an enlarged terminal head which is firmly anchored in the valve element by the resilient tension of the valve extension and of the valve element.

If the fluid pressure in the valve is very high, the outer chambers may be sealed, filled with liquid, and connected through an axial bore in the actuating rod. The movements of the valve element may be damped by providing a throttling element in the bore of the rod. The damping fluid is introduced and replenished through a passage in the casing closed by a plug.

Two embodiments of the invention are shown in the accompanying drawing in which.

Figure 1:
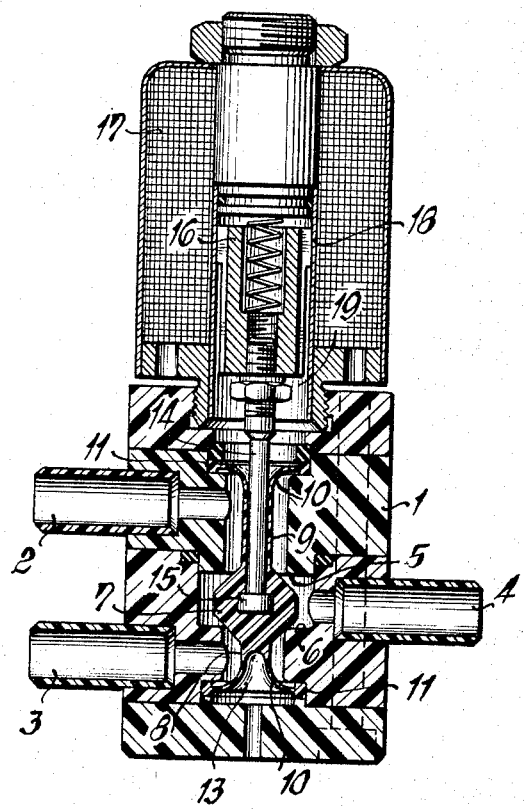
FIG. 1 shows a two-way valve of the invention in elevational section.

Referring initially to FIG. 1 there is seen a valve casing 1 equipped with pipe nipples 2, 3, 4, which communicate with three portions of a valve chamber in the cavity of the casing 1 defined by valve seats 5, 6, as is conventional. The casing 1 and its valve seats are made of plastics for resistance to corrosive fluids.

A poppet valve element 7 which has two coaxial conical faces tapering in opposite directions is arranged axially between the valve seats 5, 6. It consists of yieldably resilient plastic and has two integral, coaxial, tubular extensions 8, 9. The free ends 10 of the extensions each flare into a funnel shape and form membranes which are tightly clamped to the casing 1 by sealing rings 11. The membranes bound the valve chamber and separate it from axially outer chamber 13, 19. They also maintain at least a partial balance of pressure between the chambers.

The actuating rod 14 of the valve has an enlarged head 15 which is held tightly in the valve element 7 by the resilient tension of the latter, and extends coaxially outward through the extension 9 into the outer chamber 19 in which it is attached to the armature 16 of a solenoid 17, the armature being axially guided in a sleeve 18.

Figure 2:
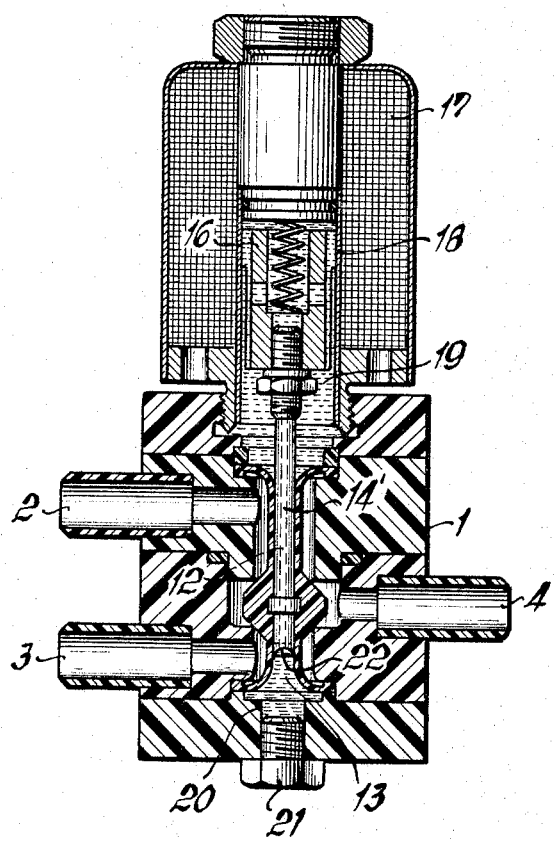
FIG. 2 shows a modified valve in a corresponding view.

A valve of closely similar construction suitable for high-pressure operation is illustrated in FIG. 2. It has a hollow actuating rod 14' which extends through the valve element 7 and both extensions 8, 9 to connect the outer chambers 13, 19. The bore 12 of the rod 14' and the chambers 13, 19 are filled with a liquid admitted through a passage 20 in the casing 1 communicating with the chamber 13, and normally closed by a threaded plug 21. The liquid prevents excessive deformation of the membranes 10 by the pressure of the controlled fluid.

Movement of the valve element 7 by the solenoid 17 is damped by an annular throttling element 22 threadedly inserted into the bore 12 of the rod 14'.

The actuating rod 14, 14' is preferably embedded in the valve element 7 during the molding of the latter. The throttling element 22 may be inserted or replaced in the rod 14' through the passage 20.

I claim:

1. In a solenoid-operated valve having a casing defining a cavity therein, said cavity having an axis; two valve seats axially spaced in said cavity; a double acting poppet valve element movable in said cavity between positions of engagement with said valve seats respectively; and a solenoid for operating said valve element; the improvement comprising:
    (a) two tubular axial extensions extending from said valve element in opposite directions, each extension having a flaring end remote from said valve element, and the element and said extensions thereof being made of yieldably resilient material;
    (b) fastening means sealingly fastening said flaring ends to said casing, whereby said ends constitute membrane means axially bounding a valve chamber therebetween, said seats being in said chamber and said solenoid being outside said chamber; and
    (c) an actuating rod member extending through one of said extensions into said valve element, said rod member connecting said solenoid to said element.

2. In a valve as set forth in claim 1, said valve element having two sealing faces respectively engaging said seats in said positions of the element, said rod member having an end portion anchored in said element axially intermediate said faces.

3. In a valve as set forth in claim 2, said end portion of the rod member constituting an enlarged head held in said valve element by the resilient tension of the element.

4. In a valve as set forth in claim 1, said casing including means defining respective outer chambers axially separated from said valve chamber by said membranes, said rod member being formed with a bore connecting said outer chambers, and a liquid substantially filling said outer chamber and said bore.

5. In a valve as set forth in claim 4, said casing being formed with a passage communicating with one of said outer chambers, and plug means releasably closing said bore.

6. In a valve as set forth in claim 4, a constricting element in said bore.

References Cited

UNITED STATES PATENTS

| 2,842,400 | 7/1958 | Booth et al. | 251—331 X |
| 3,098,635 | 7/1963 | Delaporte et al. | 251—129 X |
| 3,104,089 | 9/1963 | Seltsam | 251—331 X |

FOREIGN PATENTS

| 1,085,736 | 7/1960 | Germany. |

M. CARY NELSON, *Primary Examiner.*

W. JOHNSON, R. C. MILLER, *Assistant Examiners.*